US008666424B2

(12) United States Patent
Wang

(10) Patent No.: US 8,666,424 B2
(45) Date of Patent: Mar. 4, 2014

(54) SYSTEMS, METHODS, AND MEDIA FOR REDUCING FEMTOCELL INTERFERENCE

(75) Inventor: Xiaodong Wang, Ramsey, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 26 days.

(21) Appl. No.: 13/458,766

(22) Filed: Apr. 27, 2012

(65) Prior Publication Data

US 2013/0072205 A1    Mar. 21, 2013

Related U.S. Application Data

(60) Provisional application No. 61/479,718, filed on Apr. 27, 2011.

(51) Int. Cl.
  *H04W 72/00* (2009.01)
  *H04B 1/00* (2006.01)

(52) U.S. Cl.
  USPC ............................ 455/450; 455/63.1; 455/444

(58) Field of Classification Search
  None
  See application file for complete search history.

(56) References Cited

U.S. PATENT DOCUMENTS

2010/0087148 A1* 4/2010 Srinivasan et al. ............ 455/63.1
2011/0086641 A1* 4/2011 Guvenc et al. ................. 455/437
2012/0009909 A1* 1/2012 Lau .............................. 455/418

OTHER PUBLICATIONS

"Femtocell Designs Sniff Out Cells: Enables Self-Organizing Wireless Networks", Cellular-News.com, Nov. 7, 2008, available at: http://www.cellular-news.com/story/34526.php.

"Simulation Assumptions and Parameters for FDD HeNB RF Requirements", Report R4-092042, in 3GPP TSG RAN WG4 (Radio) Meeting #51, San Francisco, CA, US, May 4-8, 2009.

Arulselvan, N., et al., "Distributed Power Control Mechanisms for HSDPA Femtocells", In Proceedings of the 69th IEEE Vehicular Technology Conference, (VTC '09), Barcelona, ES, Apr. 26-29, 2009, pp. 1-5.

Chandrasekhar, V. and Andrews, J.G., "Spectrum Allocation in Tiered Cellular Networks", in IEEE Communications Magazine, vol. 57, No. 10, Oct. 2009, pp. 3059-3068.

(Continued)

*Primary Examiner* — Erika A Washington
(74) *Attorney, Agent, or Firm* — Byrne Poh LLP

(57) ABSTRACT

Systems, methods, and media for reducing femtocell interference are provided. In some embodiments, systems for reducing femtocell interference are provided, the systems comprising: at least one hardware processor that: estimates a total path loss between a macrocell user (MU) and a mobile base station (MBS); estimates a path loss from the MU user to a femtocell access point (FAP); determines whether the MU can meet a first target signal to interference plus noise ratio (SINR); determines whether a transmission from the MU will prevent a femtocell user (FU) of the FAP from achieving a second target SINR; and restricts the MU to using subcarriers not used by the FAP when it is determined that the MU cannot meet the first target SINR and/or it is determined that the transmission from the MU will prevent the FU from achieving the second target SINR.

24 Claims, 7 Drawing Sheets

(56) References Cited

OTHER PUBLICATIONS

Chandrasekhar, V. and Andrews, J.G., "Uplink Capacity and Interference Avoidance for Two-Tier Femtocell Networks", in IEEE Transactions on Wireless Communications, vol. 8, No. 7, Jul. 2009, pp. 3498-3509.

Chandrasekhar, V., et al., "Femtocell Networks: A Survey", In IEEE Communications Magazine, vol. 46, No. 9, Sep. 2008, pp. 59-67.

Chandrasekhar, V., et al., "Power Control in Two-Tier Femtocell Networks", in IEEE Transactions on Wireless Communications, vol. 8, No. 8, Aug. 2009, pp. 4316-4328.

Claussen, H., "Performance of Macro- and Co-Channel Femtocells in a Hierarchical Cell Structure", In Proceedings of the IEEE 18th International Symposium on Personal, Indoor and Mobile Radio Communications (PIMIC '07), Athens, GR, Sep. 3-7, 2007, pp. 1-5.

Claussen, H., et al., "An Overview of the Femtocell Concept", In Bell Labs Technical Journal, vol. 13, No. 1, Spring 2008, pp. 221-245.

Erceg, V., et al., "IEEE P802.11 Wireless LANs: TGn Channel Models", Technical Report IEEE 802.11-03/940r1, Jan. 9, 2004, available at: http://www.iitk.ac.in/mwn/papers/11-03-0940-01-000n-tgn-channel-models.pdf.

Garcia, L.G.U., et al., "Autonomous Component Carrier Selection: Interference Management in Local Area Environments for LTE-Advanced", In IEEE Communications Magazine, vol. 47, No. 9, Sep. 2009, pp. 110-116.

IEEE Computer Society and IEEE Microwave Theory and Techniques Society, "IEEE Standard for Local and Metropolitan Area Networks Part 16: Air Interface for Fixed Broadband Wireless Access Systems", Technical Report, IEEE Std 802.16-2004 (Revision of IEEE Std 802.16-2001), Oct. 1, 2004, pp. 1-857.

Jo, H.S., et al., "A Self-Organized Uplink Power Control for Cross-Tier Interference Management in Femtocell Networks", In Proceedings of the IEEE Military Communications Conference (MILCOM '08), San Diego, CA, US, Nov. 16-19, 2008, pp. 1-6.

Jo, H.S., et al., "Interference Mitigation Using Uplink Power Control for Two-Tier Femtocell Networks", In IEEE Transactions on Wireless Communications, vol. 8, No. 10, Ocotober 2009, pp. 4906-4910.

Kim, Y., et al., "Performance Analysis of Two-Tier Femtocell Networks with Outage Constraints", In IEEE Transactions on Wireless Communications, vol. 9, No. 9, Sep. 2010, pp. 1695-2700.

Li, X., et al., "Downlink Power Control in Co-Channel Macrocell Femtocell Overlay", In Proceedings of the 43rd Annual Conference on Information Sciences and Systems (CISS '09), Baltimore, MD, US, Mar. 18-20, 2009, pp. 383-388.

López-Pérez, D., et al., "OFDMA Femtocells: A Roadmap on Interference Avoidance", In IEEE Communications Magazine, vol. 47, No. 9, Sep. 2009, pp. 41-48.

Neruda, M., et al., "Femtocells in 3G Mobile Networks", In Proceedings of the 16th International Conference on System, Sigel and Image Processing (IWSSIP '09), Chalkida, GR, Jun. 18-20, 2009, pp. 1-4.

So-In, C., et al., "Capacity Evaluation for IEEE 802.16e Mobile WiMAX", In Journal of Computer Systems, Networks, and Communications, vol. 1, No. 1, Apr. 2010.

Su, Q., et al., "A Distributed Dynamic Spectrum Access and Power Allocation Algorithm for Femtocell Networks", In Proceedings of the IEEE International Conference on Wireless Communications & Signal Processing (WCSP '09), Nanjing, CN, Nov. 13-15, 2009, pp. 455-459.

Tokgoz, Y., et al., "Uplink Interference Management for HSPA+ and 1xEVDO Femtocells", In Proceedings of the 28th IEEE Conference on Global Telecommunications, (GLOBECOM '09), Honolulu, HI, US, Nov. 30-Dec. 4, 2009.

WiMax Forum, "WiMax Evaluation Methodology", Technical Report, Version 2.1, Jul. 7, 2008, pp. 1-209, available at: http://www.wimaxforum.org/documents/documents/WiMAX_System_Evaluation_Methodology_V2_1.pdf.

Wu, Y., et al., "A Novel Spectrum Arrangement Scheme for Femtocell Deployment in LTE Macro Cells", In Proceedings of the IEEE 20th International Symposium on Personal, Indoor and Mobile Radio Communications (PIMRC '09), Tokyo, JP, Sep. 13-16, pp. 6-11.

Yang, K., et al., "An Auction Approach to Resource Allocation in Uplink OFDMA Systems", In IEEE Transactions on Signal Processing, vol. 57, No. 11, Nov. 2009, pp. 4482-4496.

Yavuz, M., et al., "Interference Management and Performance Analysis of UMTS/HSPA+ Femtocells", In IEEE Communications Magazine, vol. 47, No. 9, Sep. 2009, pp. 102-109.

Yeh, S.P., et al., "WiMAX Femtocells: A Perspective on Network Architecture, Capacity, and Coverage", In IEEE Communications Magazine, vol. 46, No. 10, Oct. 2008, pp. 58-65.

\* cited by examiner

SYSTEMS, METHODS, AND MEDIA FOR REDUCING FEMTOCELL INTERFERENCE

CROSS REFERENCE TO RELATED APPLICATION

The application claims the benefit of U.S. Provisional Patent Application No. 61/479,718, filed Apr. 27, 2011, which is hereby incorporated by reference herein in its entirety.

TECHNICAL FIELD

Systems, methods, and media for reducing femtocell interference are provided.

BACKGROUND

In recent years, wireless operators have been experiencing a steadily increasing demand for higher data rates and better quality of service due to the constant growth in the number of active wireless terminals. One significant challenge is how to improve the indoor coverage. Studies show that over 50% of all voice calls and more than 70% of data traffic originate from indoors. Therefore, indoor coverage providing high data rate and quality-of-service (QoS) is a key issue in developing next-generation wireless systems. However, adding macrocell base station (MBS) to meet the growing indoor service demands is very expensive. Instead, femtocells using femtocell access points (FAPs) have been proposed as a new system architecture to tackle this problem.

An FAP is a simple, low-power and low-cost base station installed at a user's premise, e.g., house, office, warehouse, etc., that provides a femtocell for local access to the network by means of some cellular technology (e.g., 2G, 3G). Using femtocells benefits both users and operators. Due to the proximity between the transmitter and receiver, indoor users experience better signal quality and communicate with higher throughput. Moreover, indoor users transmit less power when being in the range of the FAP, resulting in prolonged battery life and reduced interference to the macrocell. When indoor users (e.g., the ones in their own apartments) are connected to an FAP, there are fewer indoor users transmitting in the macrocell and the overall capacity and QoS of the network improves. From the operator's point of view, femtocells can improve spectrum reuse and provide high network capacity and spectral efficiency. In addition, given that FAPs are typically paid for and maintained by the owners, the overall network cost is reduced.

On the other hand, despite these advantages, femtocells bring about multiple new challenges in terms of network architecture, interference management and synchronization. In particular, interference problems between macrocells and femtocells can become a major issue that requires new solutions due to the extra degrees of complexity in comparison with standard cellular networks.

Accordingly, new systems, methods, and media for reducing femtocell interference are provided.

SUMMARY

Systems, methods, and media for reducing femtocell interference are provided. In some embodiments, systems for reducing femtocell interference are provided, the systems comprising: at least one hardware processor that: estimates a total path loss between a macrocell user (MU) and a mobile base station (MBS); estimates a path loss from the MU user to a femtocell access point (FAP); determines whether the MU can meet a first target signal to interference plus noise ratio (SINR); determines whether a transmission from the MU will prevent a femtocell user (FU) of the FAP from achieving a second target SINR; and restricts the MU to using subcarriers not used by the FAP when it is determined that the MU cannot meet the first target SINR and/or it is determined that the transmission from the MU will prevent the FU from achieving the second target SINR.

In some embodiments, methods for reducing femtocell interference are provided, the methods comprising: estimating, using at least one hardware processor, a total path loss between a macrocell user (MU) and a mobile base station (MBS); estimating, using the at least one hardware processor, a path loss from the MU user to a femtocell access point (FAP); determining, using the at least one hardware processor, whether the MU can meet a first target signal to interference plus noise ratio (SINR); determining, using the at least one hardware processor, whether a transmission from the MU will prevent a femtocell user (FU) of the FAP from achieving a second target SINR; and restricting, using the at least one hardware processor, the MU to using subcarriers not used by the FAP when it is determined that the MU cannot meet the first target SINR and/or it is determined the transmission from the MU will prevent the FU from achieving the second target SINR.

In some embodiments, non-transitory computer-readable media containing computer-executable instructions that, when executed by a processor, cause the hardware processor to perform a method for reducing femtocell interference are provided, the method comprising: estimating a total path loss between a macrocell user (MU) and a mobile base station (MBS); estimating a path loss from the MU user to a femtocell access point (FAP); determining whether the MU can meet a first target signal to interference plus noise ratio (SINR); determining whether a transmission from the MU will prevent a femtocell user (FU) of the FAP from achieving a second target SINR; and restricting the MU to using subcarriers not used by the FAP when it is determined that the MU cannot meet the first target SINR and/or it is determined the transmission from the MU will prevent the FU from achieving the second target SINR.

DETAILED DESCRIPTION

Figure 1:
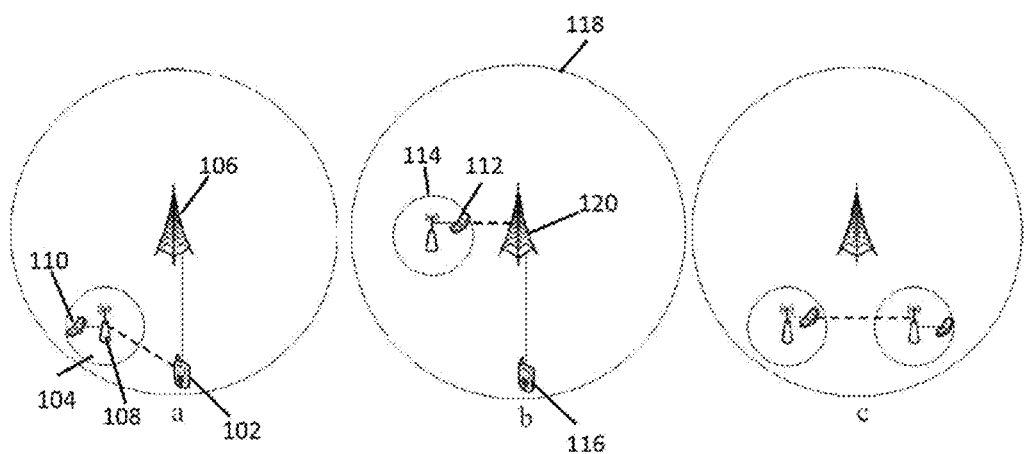
FIG. 1 is a diagram illustrating different types of macrocell and femtocell interferences that can be addressed in accordance with some embodiments.

With femtocells overlaying on top of a traditional cellular deployment, one can expect to encounter three types of uplink interference: macrocell user (MU) to femtocell access point (FAP) interference, femtocell user (FU) to macrocell base station (MBS) interference, and FU to FAP interference, as illustrated in FIGS. 1a, 1b, and 1c, respectively.

In OFDMA-based systems such as mobile WiMax, power control can be employed for the uplink. Power control can be used to ensure (when possible) that a given MU is transmitting enough power to achieve a minimum signal-to-interference-plus-noise-ratio (SINR) at the MBS receiver given the current channel condition, which can be measured by the system periodically. If an MU is located far away from the MBS, the power control algorithm can set its transmitted power to a high level to meet the target SINR value.

As depicted in FIG. 1a, however, if an MU 102 happens to be in the vicinity of a femtocell 104 using the same subcarrier and also far away from an MBS 106, then its signal could be high enough to propagate through the walls of a building where an FAP 108 is deployed and generate interference. In fact, it is indeed on the macrocell edge where femtocells are most necessary and useful, so this kind of interference is expected to be very frequent.

Due to frequency reuse among femtocells, it is possible that a FU 112 in a femtocell 114 may use the same subcarrier as an MU 116, and thus the FU may interfere with a macrocell 118, as depicted in FIG. 1b. In order to overcome the interference from an FU 112 to an MBS 120, the MBS can measure the interfered subcarrier and apply uplink power control on MU 116, which will determine that it needs to transmit higher power in order to reach its target SINR at the receiver. This increase of the transmission power may worsen MU to FAP interference.

In accordance with some embodiments, to treat the uplink interference problem in orthogonal frequency-division multiple-access (OFDMA)-based femtocell networks with partial co-channel deployment, mechanisms for mitigating inter-tier interference are provided. In accordance with some embodiments, femto-interfering macrocell users can be required to use only some dedicated subcarriers, and non-interfering macrocell users can use either the dedicated subcarriers or shared subcarriers, which can also be used by femtocell users. Mechanisms for allocating subcarriers based on auction algorithms for macrocell users and femtocell users to independently mitigate intra-tier interferences are also provided in some embodiments.

Figure 2:
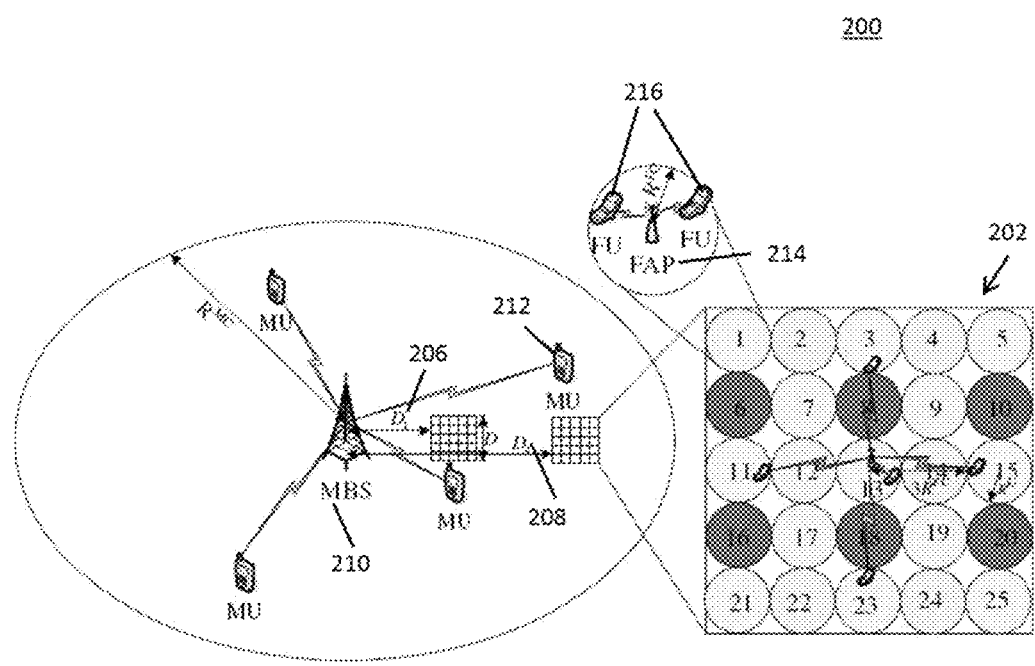
FIG. 2 is a diagram illustrating different components and their arrangement in macrocell and femtocells in accordance with some embodiments.

An example of femtocells and macrocell coexistence in a two-tier network 200 is illustrated in FIG. 2. In such a network, femtocells 202 are in one tier and a macrocell 204 is in another tier. The femtocells overlay on top of the macrocell forming a hierarchical cell structure. At distances $D_1$ 206 and $D_2$ 208 from MBS 210 (which can be any suitable distances), two groups (or any other suitable number) of twenty five femtocells (or any other suitable number) can be arranged in square grids (e.g., in a residential neighborhood) of area $D^2=10000\,m^2$ (or any other suitable size), with five femtocells (or any other suitable number) per dimension. The radius of each femtocell can be $R^{FC}=10\,m$ (or any other suitable size). The FAPs can be located in the center of their corresponding femtocells. The coverage radius of the macrocell can $R^{MC}=500\,m$ (or any other suitable size).

Given a total number of available subcarriers N, $N_s$ subcarriers can be shared by the FUs and the MUs, and the remaining $(N-N_s)$ subcarriers can be used by MUs only. The transmitting power of a MU can be denoted as $P^{MU}$ and $P_{min}^{MU} \leq P^{MU} \leq P_{max}^{MU}$ by using power control according to the measurement of each subcarrier channel state. Owing to the small radius of the femtocell, and FU and MU being the same type of terminal, the transmission power of an FU, $P^{FU}$, can be constant and $P^{FU}=P_{min}^{MU}$.

In accordance with some embodiments, MU power control, and channel selection can be used to mitigate interference between MUs 212 and FAPs 214 and between FUs 216 and MBSs 210. In order to do so, an MU can first use power control to improve its SINR in order to satisfy its QoS requirement. If the MU cannot reach its minimum SINR requirement (e.g., due to it being a long distance from its MBS and/or interference from one or more FUs), it can switch to a dedicated subcarrier. If the MU can meet its target SINR, then it can be checked whether or not the MU's transmission power is strong enough to interfere with its nearest co-channel FU. If the position of the MU is close enough to an FAP to interfere with the co-channel FU, the MU can use a dedicated subcarrier. Otherwise the MU can use a shared subcarrier.

Figure 3:
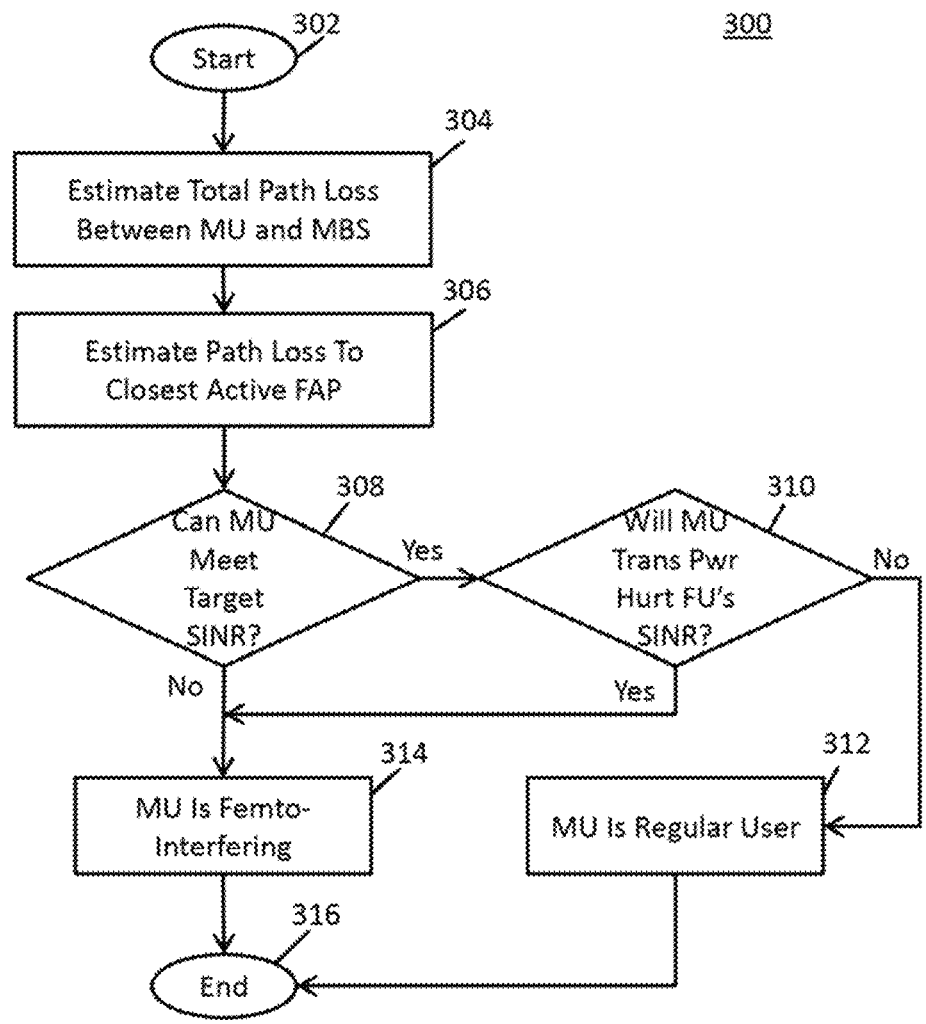
FIG. 3 is a diagram illustrating a process for classifying macrocell users in accordance with some embodiments.

More particularly, for example, such a process 300 can be performed as shown in FIG. 3. As illustrated, after process 300 begins at 302, for a given MU m, an estimate of the total path loss to its MBS ($\chi_m^{MU}$) can be made at 304. Next, at 306, an estimate of the path loss to the MU's closest active FAP ($\chi_m^{MF}$) can be made by measuring the Reference Signal Received Power (RSRP) of the active FAPs in the downlink. Then, at 308, it can be determined whether the MU can meet its target SINR by using power control. If so, then, at 310, process 300 can determine whether the transmission power of this MU may cause its closest FUs' SINR to drop below the FUs' minimum requirements. If it is determined at 310 that the FUs in the closest femtocells can satisfy their SINR requirements, then, at 312 the MU can be designated as a regular user and as able to use either the shared subcarriers or the dedicated subcarriers. Otherwise, if it is determined at either at 308 or 310 that the MU or an FU, respectively, cannot meet its minimum SINR, the MU can be designated as a femto-interfering user and can be restricted to using only dedicated subcarriers at 314. After designating an MU as a regular user or a femto-interfering user at 312 or 314, respectively, process 300 can terminate at 316.

As another example, to designate an MU as a "regular user" or a "femto-interfering user," a scenario in which an FU is at the edge of the femtocell can be considered. In this scenario, one can assume that the estimated distance from the MU to the closest FAP is $d^{MF}$ based on the RSRP measurement. Then, to prevent an MU from interfering with an FU in the closest femtocell, the SINRs of the MU and the FU can be required to satisfy the following constraints:

$$\gamma^{FU} = \frac{P^{FU} G^F / \chi^{FU}}{I^{MF} + I^{FF} + W} >= \gamma_{min}^{FU}, \quad (1)$$

and $$\gamma^{MU} = \frac{P^{MU} G^M / \chi^{MU}}{I^{FM} + W} >= \gamma_{min}^{MU}, \quad (2)$$

where:
  $P^{FU}$ is the output power of the FU;
  $G^F$ is the gain of the FU;
  $P^{MU}$ is the output power of the MU;
  $G^M$ is the gain of the MU;
  W accounts for the noise power;
  $\chi^{FU}$ denotes the path loss from the FU to its FAP;
  $\chi^{MU}$ denotes the path loss from the MU to its MBS;
  $\gamma_{min}^{FU}$ is the minimum SINR requirement for the FU;
  $\gamma_{min}^{MU}$ is the minimum SINR requirement for the MU;
  $I^{MF}$ is the interference from the MU to the FAP;

$I^{FF}$ is the interference from FUs in other femtocells to a given FU; and $I^{FM}$ is the interference from FUs to the MU.

$I^{MF}$, the interference from the MU to the FAP, can be given by $$I^{MF} = \frac{P^{MU} G^F}{\chi^{MF}} \quad (3)$$

where $P^{MU}$ is the transmit power of the MU, $G^F$ is the antenna gain of the FAP, and $\chi^{MF}$ is the path loss from the MU to the FAP and is related to $d^{MF}$.

$I^{FF}$, the interference from FUs in other femtocells to a given FU, can be caused by FUs in adjacent femtocells as well as by FUs in non-adjacent femtocells in some embodiments. When intra-tier subcarrier allocation across adjacent femtocells is performed as described below, the impact of adjacent femtocells on $I^{FF}$ can be ignored in some embodiments. In such embodiments, $I^{FF}$ can be estimated based on the interference that would be caused by a scenario in which the FUs in the four closest, non-adjacent femtocells (e.g., femtocells 220, 222, 224, and 226 of FIG. 2) use the same subcarrier as the given FU (e.g., femtocell 228 of FIG. 2). In such a scenario, interference from the interfering FUs can be given by:

$$I^{FF} = \frac{4 P^{FU} G^{FA}}{\chi^{FF}} \quad (4)$$

where $\chi^{FF}$ accounts for the path loss from one of the interfering FUs (e.g., in one of femtocells 220, 222, 224, and 226 of FIG. 2) to the FAP of the given FU (e.g., the FAP in femtocell 228 of FIG. 2), which path loss $\chi^{FF}$ can be calculated using the distance of $3R^{FC}$ (as shown in FIG. 2).

$I^{FM}$, the interference from FUs to the MU, can be given by $$I^{FM} = \sum_{i \in M_{int}} \frac{P^{FU} G^F}{\chi_i^{FM}} \quad (5)$$

where $M_{int}$ indicates the set of interfering FUs to the MU, and $\chi_i^{FM}$ is the path loss from the ith FU in $M_{int}$ to the MBS. The interference can be estimated by performing uplink measurements of RSRP by the MBS.

Taking equalities in (1) and (2), and using (3)-(5), $\chi^{MU}$ can be solved for and the maximum path loss from MU to its MBS, $\chi_{max}^{MU}$, with the constraints of (1) and (2) obtained as follows:

$$\chi_{max}^{MU} = \frac{\chi^{MF} G^M \left( \frac{P^{FU}}{\gamma_{min}^{FU} \chi^{FU}} - \frac{I^{FF} + W}{G^F} \right)}{(I^{FM} + W) \gamma_{min}^{FU}}. \quad (6)$$

All the parameters on the right-hand side of (6) are constants except for the two variables $\chi^{MF}$ and $I^{FM}$. Thus, $\chi_{max}^{MU}$ is primarily affected by the path loss from the MU to its closest FAP, $\chi^{MF}$, and the interference from the FUs to the MBS, $I^{FM}$. Due to frequency reuse among femtocells, the value of $I^{FM}$ is mainly related to the minimum distance from FUs to the MBS and the active probability of femtocells, which varies more slowly than $\chi^{MF}$. Therefore, different MUs have different $\chi_{max}^{MU}$ due to their different locations. The MU with a larger distance from its closest FAP will have a larger $\chi_{max}^{MU}$.

Any suitable path loss model(s) can be used for making these determinations in some embodiments. For example, in some embodiments, a path loss model based on suburban deployment of FAPs located in single-floor houses/buildings can be used. In this model, the path loss between an FU and an FAP, where the FU is inside a different house that the FAP, can be calculated as:

$$\chi = \max(15.3 + 37.6 \log_{10} d, 38.46 + 20 \log_{10} d) + 0.7 d_{indoor} + n_w L_w + X. \quad (7)$$

The pass loss between an FU and an FAP, where the FU is inside the same house as the FAP, can be calculated as:

$$\chi = 38.46 + 20 \log_{10} d + 0.7 d_{indoor} + X. \quad (8)$$

The pass loss between an MU and an FAP, where the MU is outside, and the path between an FU and an MBS, where the FU is inside a house, can be calculated as:

$$\chi = \max(15.3 + 37.6 \log_{10} d, 38.46 + 20 \log_{10} d) + 0.7 d_{indoor} + n_w L_w + X. \quad (9)$$

The pass loss between an MU and an MBS, where the MU is outside, can be calculated as:

$$\chi = 15.3 + 37.6 \log_{10} d + X. \quad (10)$$

In equations (7)-(10): d is the transmitter-receiver separation in meters; $d_{indoor}$ is the indoor distance in meters; $L_w$ is the penetration loss through external walls, generally assumed to be 15 dB; and $n_w$ is the number of penetrated walls. Using an intra-tier interference mitigation scheme among femtocells (as described below) we can assume that $n_w >= 2$ for the path loss $\chi^{FF}$. In some embodiments, a general normal distribution with a standard deviation of 4 dB can be used for the shadow fading X(dB) for the pass loss between an FU and an FA, where the FU is inside the same house as the FAP, and a general normal distribution with a standard deviation of 8 dB can be used for the shadow fading X(dB) for other path losses.

Once $\chi_{max}^{MU}$ has been determined, an MU whose path loss to its MBS is less than its corresponding $\chi_{max}^{MU}$ can be classified as a regular user and enabled to use either a dedicated subcarrier or a shared subcarrier. An MU whose path loss to its MBS is greater than its corresponding $\chi_{max}^{MU}$ can be classified as a femto-interfering user and restricted to using only a dedicated subcarrier.

As described above, subcarriers can be allocated to MUs based on whether those MUs are determined to be regular users or femto-interfering users. Any suitable technique for allocating subcarriers can be used in some embodiments. For example, in some embodiments, subcarriers can be allocated based on the following:

$$\max_{\{a_{mn}^{MU}\}} \Sigma_{m=1}^M \omega_m (\Sigma_{n=1}^N c_{mn}^{MU} a_{mn}^{MU}),$$

$$s.t. \ a_{mn}^{MU} \in \{0, 1\},$$

$$\Sigma_m a_{mn}^{MU} <= 1, \forall n,$$

$$\Sigma_n a_{mn}^{MU} = k_m, \forall m,$$

$$a_{mn}^{MU} = 0, \forall n \in F_s, \forall m \in U_{int} \quad (11)$$

where:
M is the number of MUs;
$\omega_m$ is a priority or weighting factor for the mth MU;
$c_{mn}^{MU}$ denotes the data rate for MU m on subcarrier n;
$a_{mn}^{MU}$ is an indicator variable such that $a_{mn}^{MU} = 1$ if the nth subcarrier is allocated to the mth MU, otherwise $a_{mn}^{MU} = 0$;

$F_s$ is the set of shared subcarriers;
$U_{int}$ is the set of femto-interfering users;
Each subcarrier is only assigned to one user; and
The mth MU requires to be allocated $k_m$ subcarriers and $\Sigma_m k_m \leq N$.

If the nth subcarrier for MU m has SINR $\gamma_{mn}^{MU}$, assuming a 3 dB gap to theoretical rate; then its rate can be estimated as $$c_{mn}^{MU} = \log\left(1 + \frac{\gamma_{mn}^{MU}}{2}\right) \text{ (bits/channel use)} \quad (12)$$

The second constraint in (11) indicates that any subcarrier can be allocated to at most one MU to avoid intra-cell interference. The third constraint in (11) defines the number of subcarriers allocated to an MU m is $k_m$. Finally, the last constraint in (11) prevents the femto-interfering MUs $U_{int}$ from occupying the shared subcarriers.

Note that here the STNR values may incorporate the short-term channel fading effects and are assumed to be perfectly calculated by the MBS at the beginning of each iteration (i.e., at the beginning of each frame) by performing uplink measurements of RSRP of FUs (i.e., the interference from FUs) and subcarrier channel state.

In some embodiments, the optimization problem given by (11) can be translated into a special 0-1 combinatorial optimization problem by introducing a dummy user with index=m=0, such that $c_{0,n}^{MU}=0$, $\forall n$, and the number of its allocated subcarriers $k_0=N-\Sigma_{m=1}^M k_m$, with the understanding that any subcarrier assigned to the dummy user is not used for data transmission. The mth user can be divided into $k_m$ "sub-users" and an indicator variable $\tilde{a}_{m,l,n}^{MU}$, $l=1, 2, \ldots, k_m$ can be defined such that $\tilde{a}_{m,l,n}^{MU}=1$ if the nth subcarrier is allocated to the lth sub-user of the mth user. In addition, let $\tilde{\omega}_{m,l} \triangleq \omega_m$ and $\tilde{c}_{m,l,n}^{MU} \triangleq c_{mn}^{MU}$, $l=1, 2, \ldots, k_m$. Thus the original optimization problem (11) can be converted to the following:

$$\max_{\{\tilde{a}_{m,l,n}^{MU}\}} \Sigma_{m=0}^{M} \Sigma_{l}^{k_m} \tilde{\omega}_{m,l} (\Sigma_{n=1}^{N} \tilde{c}_{m,l,n}^{MU} \tilde{a}_{m,l,n}^{MU}),$$

$$s.t. \; \Sigma_m \Sigma_l \tilde{a}_{m,l,n}^{MU}=1, \forall n$$

$$\Sigma_n \tilde{a}_{m,l,n}^{MU}=1, \forall m,l,$$

$$\tilde{a}_{m,l,n}^{MU}=\{0,1\},$$

$$\tilde{a}_{m,l,n}^{MU}=0, \forall n \in F_s, \forall m \in U_{int}, \quad (13)$$

which is a symmetric assignment problem. Such an assignment problem can be solved efficiently using an auction algorithm in some embodiments.

Assuming a set of prices $\{r_n, n=1, \ldots, N\}$, a total number of objects N, and a positive scalar $\epsilon$, a player m can be defined as being happy with the object $n_m$ if the profit (i.e., reward minus price) of assigning object $n_m$ to player m is within $\epsilon$ from a maximum profit. For example, this relationship can be represented as:

$$f_{mn_m}-r_{n_m} \geq \max_n\{f_{mn}-r_n\}-\epsilon, \quad (14)$$

where:
$f_{mn_m}$ denotes the reward of object $n_m$ to player m; and
$r_{n_m}$ represents the current price of object $n_m$.

If an object $n_m$ assigned to player m does not satisfy the inequality (14), player m is defined as being unhappy. For problem (13), the reward denotes the data throughput of each subcarrier for every sub-user and the price is an increasing variable during the auction process.

Figure 4A:
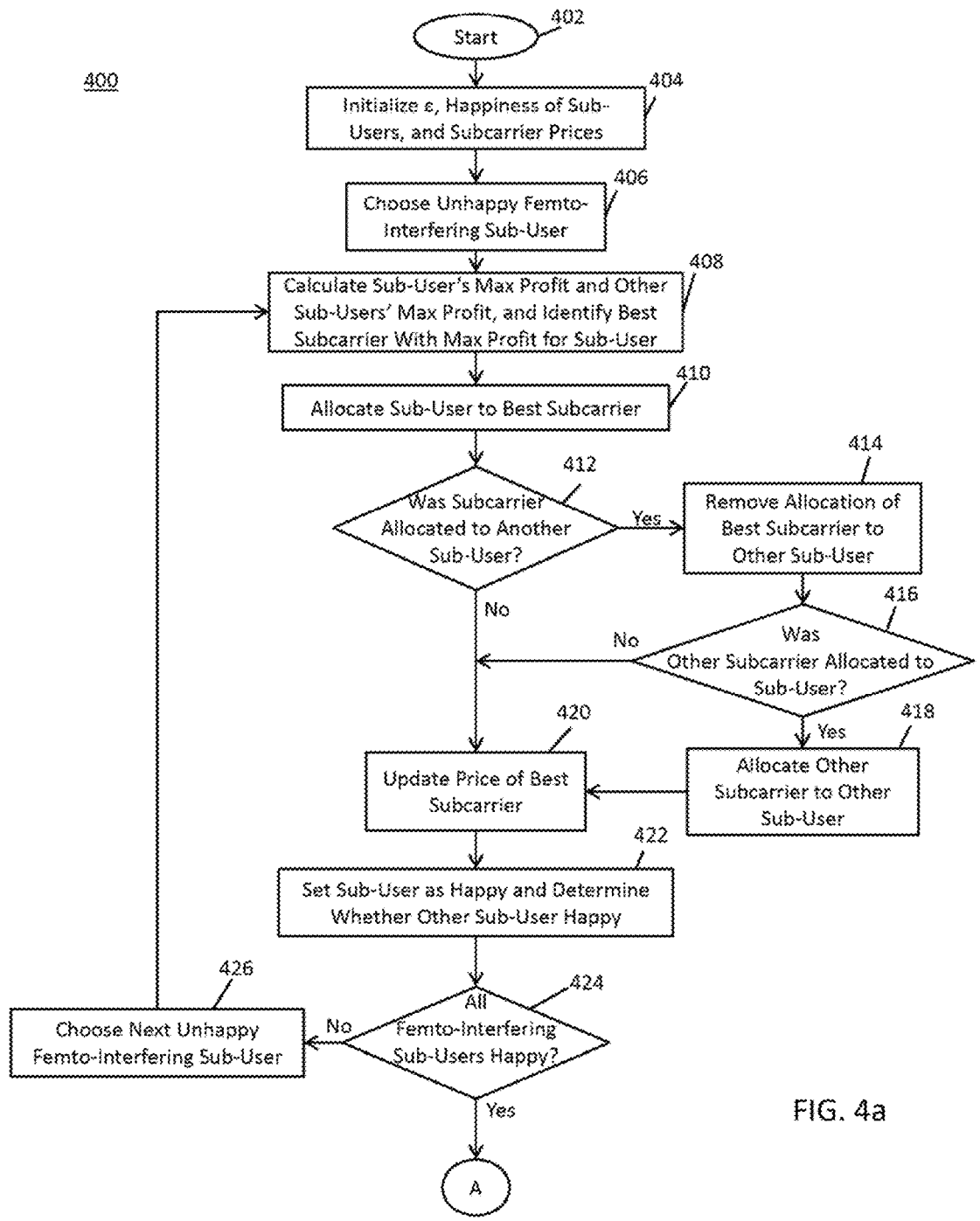
FIGS. 4a and b are diagrams illustrating a process for performing an auction process for allocating subcarriers to macrocell users in accordance with some embodiments.
Figure 4B:
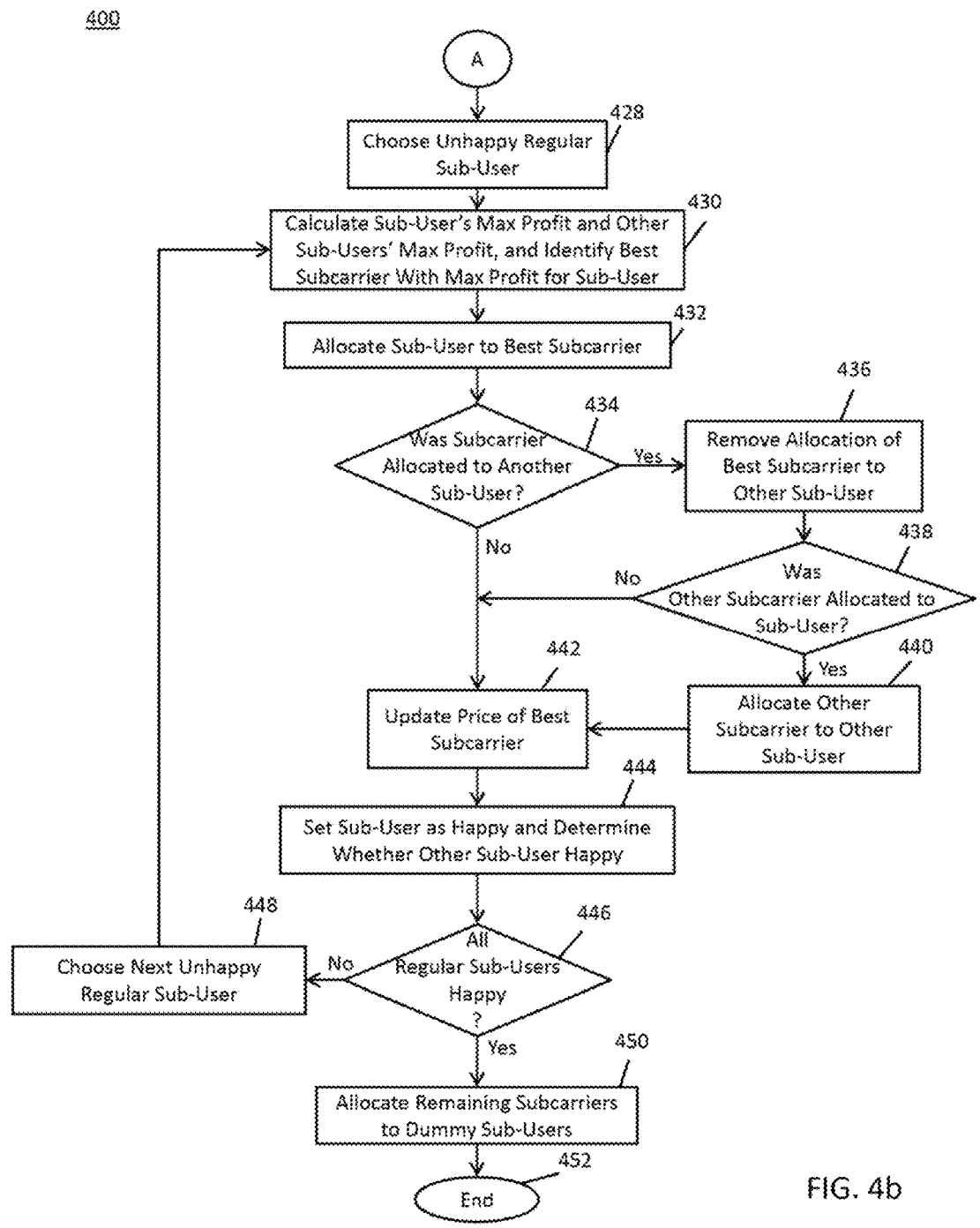

An example of an auction process for solving (13) that can be used in some embodiments is shown in FIGS. 4a and 4b.

Turning to FIG. 4a, after process 400 has begun at 402, the process can initialize $\epsilon$, the happiness of sub-users, and subcarrier prices at 404. For example, any suitable a can be selected, all sub-users (except for the dummy sub-users) can be set as being unhappy, and the price for every subcarrier $r_n$ can be set to zero.

Next, at 406, process 400 can choose an unhappy femto-interfering sub-user from the set of femto-interfering sub-users Uint. The process can next calculate the chosen sub-user's maximum profit and other femto-interfering sub-users' maximum profit, and identify the best subcarrier $(n_{m,l})$ with the maximum profit for the sub-user, at 408. These maximum profits can be calculated in any suitable manner. For example, the chosen sub-user's maximum profit can be calculated as $\phi_{m,l,n_{m,l}}=\max_n(f_{m,l,n}-r_n)$. As another example, the other sub-users' maximum profit can be calculated as $\phi_{m,l,\bar{n}_{m,l}}=\max_{n,n \neq n_{m,l}}(f_{m,l,n}-r_n)$. $f_{m,l,n}$ can be calculated as being equal to $\tilde{c}_{m,l,n}^{MU}$, as described above. At 410, the best subcarrier $n_{m,l}$ can be allocated to the chosen sub-user (m,l).

It can next be determined if this best subcarrier has already been allocated to another femto-interfering subuser ($\bar{m}$, $\bar{l}$) at 412, and if so, that allocation can be removed at 414. Then, at 416, process 400 can determine if sub-user (m,l) was previously assigned to a subcarrier, and if so, at 418, allocate that subcarrier to the other femto-interfering sub-user ($\bar{m}$, $\bar{l}$).

If it is determined at 412 that the subcarrier was not allocated to another sub-user or it is determined at 416 that the other subcarrier was not allocated to the chosen sub-user, or after allocating the other subcarrier to the other sub-user at 418, process 400 can then proceed to 420 at which it can update the price of the best subcarrier $n_{m,l}$. This updating of the price can be performed in any suitable manner. For example, in some embodiments, the price $r_{n_{m,l}}$ can be updated as follows: $r_{n_{m,l}}=r_{n_{m,l}}+(\phi_{m,l,n_{m,l}}-\phi_{m,l,\bar{n}_{m,l}})+\epsilon$.

Next, at 422, process 400 can set the chosen sub-user as being happy and can determined whether the other sub-user (if any) is happy by determining whether $f_{\bar{m},\bar{l},n_{\bar{m},\bar{l}}}-r_{n_{\bar{m},\bar{l}}} \geq \max_n\{f_{\bar{m},\bar{l},n}-r_n\}-\epsilon$.

Then, at 424, process 400 can determine whether all femto-interfering sub-users are happy. If not, the process can choose a next unhappy femto-interfering sub-user at 426 and loop back to 408. Otherwise, process 400 can continue to 428 of FIG. 4b.

As shown in FIG. 4b, at 428, process 400 can choose an unhappy regular sub-user from the set of regular sub-users Ureg. The process can next calculate the chosen sub-user's maximum profit and other regular sub-users' maximum profit, and identify the best subcarrier $(n_{m,l})$ with the maximum profit for the sub-user, at 430. These maximum profits can be calculated in any suitable manner. For example, the chosen sub-user's maximum profit can be calculated as $\phi_{m,l,n_{m,l}}=\max_n(f_{m,l,n}-r_n)$. As another example, the other sub-users' maximum profit can be calculated as $\phi_{m,l,\bar{n}_{m,l}}=\max_{n,n \neq n_{m,l}}(f_{m,l,n}-r_n)$. $f_{m,l,n}$ can be calculated as being equal to $\tilde{c}_{m,l,n}^{MU}$, as described above. At 432, the best subcarrier $n_{m,l}$ can be allocated to the chosen sub-user (m,l).

It can next be determined if this best subcarrier has already been allocated to another regular subuser ($\hat{m}$, $\hat{l}$) at 434, and if so, that allocation can be removed at 436. Then, at 438, process 400 can determine if sub-user (m,l) was previously assigned to a subcarrier, and if so, at 440, allocate that subcarrier to the other regular sub-user ($\hat{m}$, $\hat{l}$).

If it is determined at 434 that the subcarrier was not allocated to another sub-user or it is determined at 438 that the other subcarrier was not allocated to the chosen sub-user, or after allocating the other subcarrier to the other sub-user at 440, process 400 can then proceed to 442 at which it can update the price of the best subcarrier $n_{m,l}$. This updating of the price can be performed in any suitable manner. For example, in some embodiments, the price $r_{n_{m,l}}$ can be updated as follows: $r_{n_{m,l}} = r_{n_{m,l}} + (\phi_{m,l,n_{m,l}} - \phi_{m,l,\tilde{n}_{m,l}}) + \epsilon$.

Next, at 444, process 400 can set the chosen sub-user as being happy and can determined whether the other sub-user (if any) is happy by determining whether $f_{\tilde{m},\tilde{l},n_{\tilde{m},\tilde{l}}} - r_{n_{\tilde{m},\tilde{l}}} \geq \max_n \{f_{\tilde{m},\tilde{l},n} - r_n\} - \epsilon$.

Then, at 446, process 400 can determine whether all regular sub-users are happy. If not, the process can choose a next unhappy regular sub-user at 448 and loop back to 430. Otherwise, process 400 can continue to 450 at which it can allocate remaining subcarriers to dummy sub-users and to 452 at which the process can terminate.

For any arbitrarily fixed $\epsilon$, this auction algorithm process can converge to an allocation that yields a total reward within $N\epsilon$ from the optimal objective function value of (13). A larger $\epsilon$ produces a worse approximation to the optimal allocation but faster convergence; while a smaller $\epsilon$ results in a better approximation to the optimal allocation but slower convergence.

In some embodiments, the designation of MUs as femto-interfering or regular can be updated at any suitable time. For example, the designation of MUs as femto-interfering or regular can be updated periodically, in response to any suitable metric, etc. In some embodiments, the channel quality of the subcarriers can similarly be updated at any suitable time (e.g., periodically, in response to a suitable metric, etc.) and then the subcarrier allocation re-performed.

In some embodiments, intra-tier subcarrier allocation to the femtocells can be performed in a distributed manner. In some embodiments, such an allocation can be made by a femtocell observing SINR for subcarriers available to it and by selecting those subcarriers with higher values.

More particularly, in some embodiments, such a subcarrier allocation process can be formulated as follows:

$$\max_{\{a_{p_q n}\}} \sum_{p_q=1}^{P} \omega_{p_q} \left( \sum_{n=1}^{N_s} c_{p_q n} a_{p_q n} \right), \quad (15)$$

$$\text{s.t. } a_{p_q n} \in \{0, 1\}, \forall p_q, n,$$

$$\sum_{p_q} a_{p_q n} \leq 1, \forall n,$$

$$\sum_n a_{p_q n} = k_{p_q}, \forall p_q,$$

where:
$p_q$ denote the pth user (or FU) in the qth femtocell;
P is the total number of FUs;
Q is the number of FAPs in a macrocell;
$\omega_{p_q}$ is a priority or weighting factor for user $p_q$;
$c_{p_q n}$ denotes the obtainable throughput for the pth FU in the qth femtocell on the nth subcarrier; and
$a_{p_q n}$ is an indicator variable, such that $a_{p_q n} = 1$ if the nth subcarrier is allocated to the pth FU in the qth femtocell.

The second constraint in (15) indicates that one given frequency can be allocated to at most one FU in the same femtocell to avoid intra-cell interference. The third constraint in (15) indicates that the number of subcarriers one FU can be allocated to is $k_{p_q}$.

$c_{p_q n}$ can be estimated based on the SINR of the subcarrier in some embodiments. More particularly, for example, if the nth subcarrier for FU p in the qth femtocell has SINR $\gamma_{p_q n}^{FU}$, assuming a 3 dB gap to theoretical rate, then its rate can be estimated as $$c_{p_q n} = \log\left(1 + \frac{\gamma_{p_q n}^{FU}}{2}\right) \text{ (bits/channel use)}.$$

The SINR of a subcarrier can be estimated by performing an interference measurement on the subcarrier by an FAP using the FAP's sniffer capability.

The optimization problem in (15) can be translated into a symmetric assignment problem by introducing dummy users as follows:

$$\max_{\{\tilde{a}_{p_q,l,n}\}} \sum_{p=0}^{P} \sum_{l}^{k_{p_q}} \tilde{\omega}_{p_q,l} \left( \sum_{n=1}^{N} \tilde{c}_{p_q,l,n} \tilde{a}_{p_q,l,n} \right), \quad (16)$$

$$\text{s.t. } \sum_{p_q} \sum_l \tilde{a}_{p_q,l,n} = 1, \forall n,$$

$$\sum_n \tilde{a}_{p_q,l,n} = 1, \forall p_q, l,$$

$$\tilde{a}_{p_q,l,n} \in \{0, 1\}.$$

In some embodiments, an auction algorithm, such as that described above, can be used to solve this symmetric assignment problem. As with the auction process described above, assuming a set of prices $\{r_n, n=1, \ldots, N\}$, a total number of objects N, and a positive scalar $\epsilon$, a player p can be defined as being happy with the object $n_p$ if the profit (i.e., reward minus price) of assigning object $n_p$ to player p is within $\epsilon$ from a maximum profit. For example, this relationship can be represented as:

$$f_{p n_p} - r_{n_p} \geq \max_n \{f_{p n} - r_n\} - \epsilon, \quad (17)$$

where:
$f_{p n_p}$ denotes the reward of object $n_p$ to player p; and
$r_{n_p}$ represents the current price of object $n_p$.

If an object $n_p$ assigned to player p does not satisfy the inequality (17), player p is defined as being unhappy. For problem (17), the reward denotes the data throughput of each subcarrier for every sub-user and the price is an increasing variable during the auction process.

Figure 5:
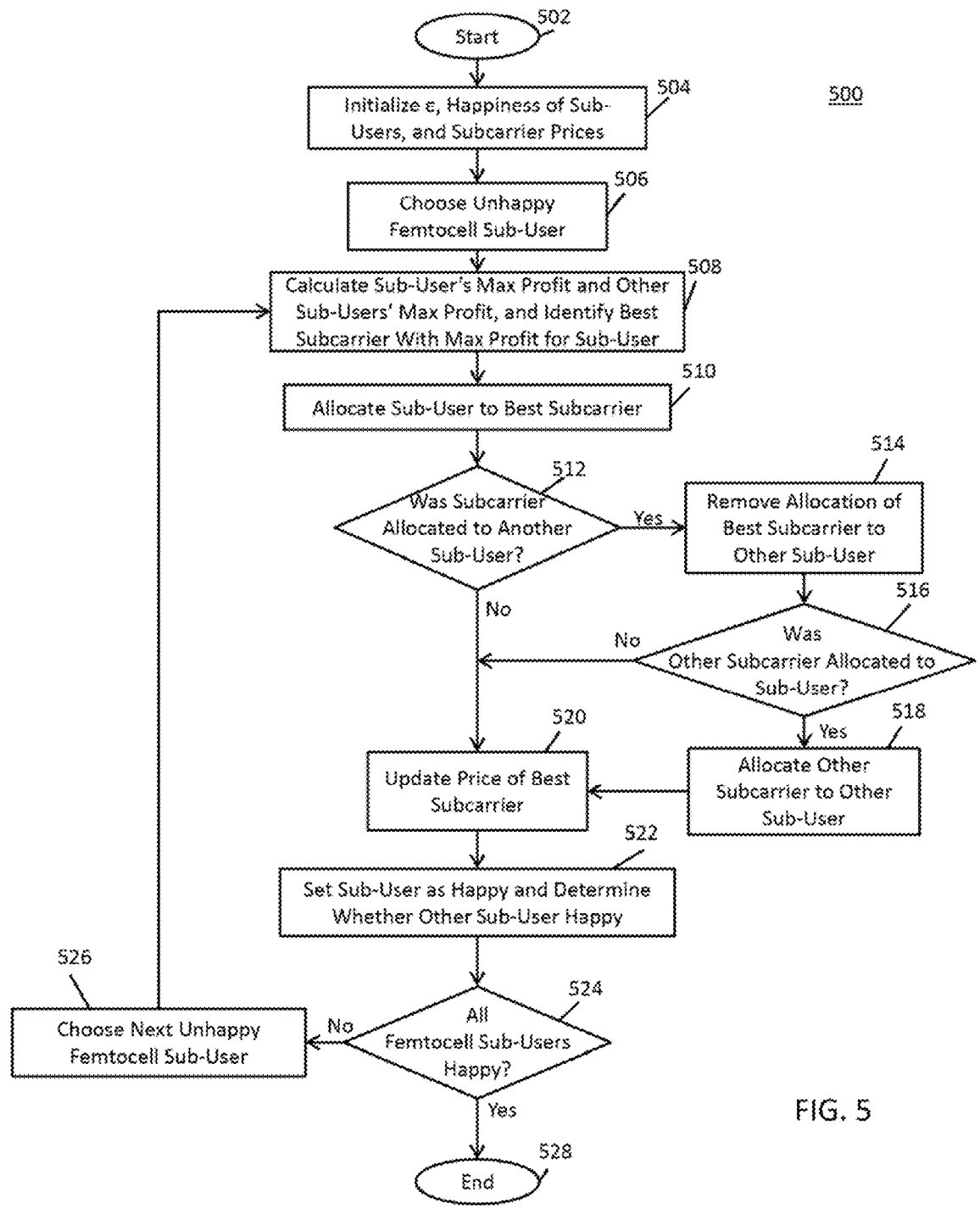
FIG. 5 is a diagram illustrating a distributed process for performing an auction process for allocating subcarriers to femtocell users in accordance with some embodiments.

An example of an auction process for solving (16) that can be used in some embodiments is shown in FIG. 5.

Turning to FIG. 5, after process 500 has begun at 502, the process can initialize $\epsilon$, the happiness of sub-users, and subcarrier prices at 504. For example, any suitable $\epsilon$ can be selected, all sub-users (except for the dummy sub-users) can be set as being unhappy, and the price for every subcarrier $r_n$ can be set to zero.

Next, at 506, process 500 can choose an unhappy sub-user from the set of sub-users. The process can next calculate the chosen sub-user's maximum profit and other sub-users' maximum profit, and identify the best subcarrier ($n_{p,l}$) with the maximum profit for the sub-user, at 508. These maximum profits can be calculated in any suitable manner. For example, the chosen sub-user's maximum profit can be calculated as $\phi_{p,l,n_{p,l}} = \max_n(f_{p,l,n} - r_n)$. As another example, the other sub-users' maximum profit can be calculated as $\phi_{p,l,\tilde{n}_{p,l}} = \max_{n, n \neq n_{p,l}}(f_{p,l,n} - r_n)$. $f_{p,l,n}$ can be calculated as being equal to $\tilde{c}_{p,l,n}$, as described above. At 510, the best subcarrier $n_{p,l}$ can be allocated to the chosen sub-user (p,l).

It can next be determined if this best subcarrier has already been allocated to another subuser $(\bar{p},\bar{l})$ at 512, and if so, that allocation can be removed at 514. Then, at 516, process 500 can determine if sub-user (p,l) was previously assigned to a subcarrier, and if so, at 518, allocate that subcarrier to the other sub-user $(\bar{p},\bar{l})$.

If it is determined at 512 that the subcarrier was not allocated to another sub-user or it is determined at 516 that the other subcarrier was not allocated to the chosen sub-user, or after allocating the other subcarrier to the other sub-user at 518, process 500 can then proceed to 520 at which it can update the price of the best subcarrier $n_{p,l}$. This updating of the price can be performed in any suitable manner. For example, in some embodiments, the price $r_{n_{p,l}}$ can be updated as follows: $r_{n_{p,l}} = r_{n_{p,l}} + (\phi_{p,l,n_{p,l}} - \phi_{p,l,\tilde{n}_{p,l}}) + \epsilon$.

Next, at 522, process 500 can set the chosen sub-user as being happy and can determined whether the other sub-user (if any) is happy by determining whether $f_{\bar{p},\bar{l},n_{\bar{p},\bar{l}}} - r_{n_{\bar{p},\bar{l}}} >= \max_n \{f_{\bar{p},\bar{l},n} - r_n\} - \epsilon$.

Then, at 524, process 500 can determine whether all subusers are happy. If not, the process can choose a next unhappy sub-user at 526 and loop back to 508. Otherwise, process 500 can terminate at 528.

In some embodiments, each FAP can periodically estimate the quality of the allocated subcarriers and update the subcarrier allocation if necessary. This periodic estimation and updating can be performed independently and asynchronously of periodic estimation and updating by other FAPs. For example, each iteration of subcarrier allocation update can be performed every $t+\Delta t$ seconds in each femtocell, where $\Delta t$ is a random back-off time that is uniformly distributed.

In some embodiments, in performing this subcarrier allocation, the interference caused by a given FU to non-neighboring FAPs can be ignored.

In some embodiments, rather than performing subcarrier allocation separately, subcarrier allocation to the femtocells can be performed in a joint manner. Such an allocation process can involve message exchanges between adjacent femtocells during each iteration to coordinate the allocation.

In such an allocation, "virtual" users can be used to capture interactions between adjacent femtocells. Every FU in a femtocell can generate a virtual user at each adjacent femtocell. Each virtual user can be allocated the same subcarriers as its corresponding FU. This way, the multi-cell subcarrier allocation problem can be decomposed into a group of single cell frequency allocation problems in which the interference between users in different femtocells is represented by constraints between its own users and the corresponding virtual users.

In some embodiments, such a multi-cell subcarrier allocation problem can be formulated as follows:

$$\max_{\{a_{p_qn}\}} \sum_{q=1}^{Q} \sum_{p_q=1}^{P} \omega_{p_q n} \left( \sum_{n=1}^{N_S} c_{p_q n} a_{p_q n} \right), \quad (18)$$

$$\text{s.t. } a_{p_q n} \in \{0, 1\}, \forall p_q, q, n,$$

$$\sum_{p_q} a_{p_q n} + \sum_{p_i \in S_q} a_{\tilde{p}_{iq} n} <= 1, \forall q, n,$$

$$\sum_n a_{p_q n} = k_{p_q}, \forall p_q, q,$$

$$a_{\tilde{p}_{iq} n} = a_{p_i n}, \forall n, p_i \in S_q, q.$$

where:
$p_q$ denote the pth user (or FU) in the qth femtocell;
P is the total number of FUs;

Q is the number of FAPs in a macrocell;
$\omega_{p_q}$ is a priority or weighting factor for user $p_q$;
$c_{p_q n}$ denotes the obtainable throughput for the pth FU in the qth femtocell on the nth subcarrier;
$a_{p_q n}$ is an indicator variable, such that $a_{p_q n} = 1$ if the nth subcarrier is allocated to the pth FU in the qth femtocell;
$S_q$ represent the q-th femtocell's interference user set containing all the users in its adjacent femtocells;
every user $p_{i,i \neq q} \in S_q$ can generate interference to the qth femtocell; and
$\tilde{p}_{iq}$ denotes the virtual user generated for the qth femtocell by the FU $p_i$ in the adjacent ith femtocell.

The first three constraints in (18) are equivalent to those for the single-cell case in (15). The fourth constraint in (18) models the effect of inter-femtocell interference.

Note that the problem in (18) is feasible if and only if $\Sigma_{p_q} k_{p_q} + \Sigma_{p_i \in S_q} k_{p_i} <= N_S$.

A greedy algorithm process can be used to solve this problem in some embodiments. In a first step of such a process, an auction method can be independently performed for resource allocation in every femtocell while ignoring the constraint that each user and its corresponding virtual user(s) must share the same resource. The reward for allocating a subcarrier in a cell to any of its users can be acquired based on the SINR and $c_{p_q n}$, while the reward for allocating a subcarrier in a cell to any virtual user is set as zero in the first step, so no cell will allocate any resource to its virtual users. In the second step, we ensure that every user occupies the same subcarriers as its corresponding virtual user(s), by trading subcarriers in a greedy fashion.

Figure 6:
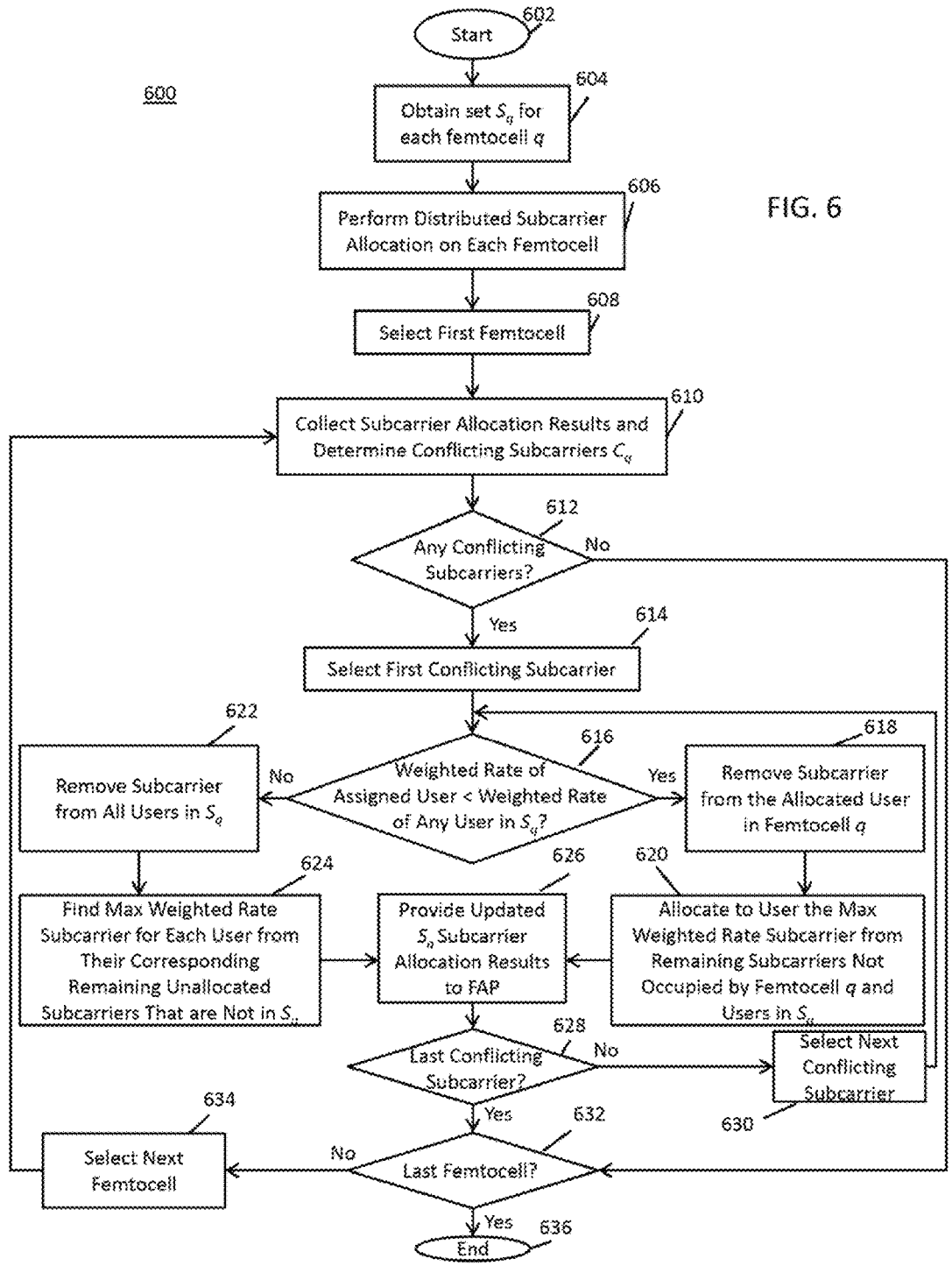
FIG. 6 is a diagram illustrating a joint process for performing an auction process for allocating subcarriers to femtocell users in accordance with some embodiments.

An example of such a process for allocating subcarriers is illustrated in FIG. 6. As shown, after beginning at 602, process 600 can obtain the set $S_q$ for each femtocell q at 604. Next, an auction algorithm can be run to perform a subcarrier allocation for every femtocell at 606. Any suitable auction algorithm can be used. For example, the auction algorithm described above for distributed intra-tier femtocell subcarrier allocation can be used in some embodiments.

Process 600 can next select the first femtocell at 608. Then, at 610, the subcarrier allocation results for each user in Sq and femtocell q can be collected, and the conflicting subcarriers (Cq) which are simultaneously occupied by the users in Sq and femtocell q can be identified.

At 612, process 600 can determine if there are any conflicting subcarriers in the femtocell. If not, then process 600 can branch to 632 where it can be determined if there are anymore femtocells to be processed. Otherwise, process 600 can proceed to 614 where the first conflicting subcarrier in the femtocell can be selected.

Next, at 616, it can be determined whether the weighted rate ($\omega_{p_q n}$) of the assigned user in femtocell q is less than that of any user in Sq. If so, then the subcarrier can be removed from allocation to corresponding user in femtocell q at 618, and the maximum weighted rate subcarrier from the remaining subcarriers which are not occupied by the femtocell q and the users in Sq can be allocated to this corresponding user in femtocell q at 620. Otherwise, the subcarrier can be removed from allocation to the corresponding users in Sq at 622, and the maximum weighted rate subcarrier for each of these users can be found from their corresponding remaining subcarriers which are not allocated to these users' femtocells and the interference user set $S_q$.

After completing 620 or 624, the updated subcarrier allocation results of each user in Sq can be provided to the corresponding FAP.

Then, at 628, process 600 can determine whether the current conflicting subcarrier is the last conflicting subcarrier for the present femtocell. If not, process 600 can select the next conflicting subcarrier at 630 and branch back to 616. Otherwise process 600 can determine if the current femtocell is the last femtocell at 632. If not, then process 600 can select the next femtocell at 634 and then branch back to 610. Otherwise, process 600 can terminate at 636.

The mechanisms and processes described herein for controlling power and allocating subcarriers in macrocells and femtocells can be used in any suitable networks incorporating macrocells and/or femtocells in some embodiments. For example, in some embodiments, these mechanisms and processes can be used in OFDMA networks. More particularly, these mechanisms and processes can be used, for example, in WiMax-OFDMA networks using any suitable modulation, such as QPSK, 16-QAM and 64-QAM (for example).

The mechanisms and processes described herein for controlling power and allocating subcarriers in macrocells and femtocells can be implemented in any suitable hardware that is part of or connected to a macrocell or femtocell in some embodiments. For example, these mechanisms and/or processes can be implemented in any of a general purpose device such as a computer or a special purpose device such as a client, a server, mobile terminal (e.g., mobile phone), etc. Any of these general or special purpose devices can include any suitable components such as a hardware processor (which can be a microprocessor, digital signal processor, a controller, etc.), memory, communication interfaces, display controllers, input devices, etc.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for reducing femtocell interference, comprising:
    at least one hardware processor that:
        estimates a total path loss between a macrocell user (MU) and a mobile base station (MBS);
        estimates a path loss from the MU user to a femtocell access point (FAP);
        determines whether the MU can meet a first target signal to interference plus noise ratio (SINR);
        determines whether a transmission from the MU will prevent a femtocell user (FU) of the FAP from achieving a second target SINR; and
        restricts the MU to using subcarriers not used by the FAP when it is determined that the MU cannot meet the first target SINR and/or it is determined that the transmission from the MU will prevent the FU from achieving the second target SINR.

2. The system of claim 1, wherein the at least one hardware processor also designates the MU as femto-interfering when it is determined that the MU cannot meet the first target SINR and/or it is determined the transmission from the MU will prevent the FU from achieving the second target SINR.

3. The system of claim 1, wherein the at least one hardware processor also performs an auction process to allocate subcarriers to the MU.

4. The system of claim 3, wherein, in performing the auction process, the at least one hardware processor also:
    (a) selects a sub-user of the MU as a selected sub-user;
    (b) identifies for the selected sub-user a first maximum profit, wherein the first maximum profit is based on a data rate of the selected sub-user and data rates of other sub-users of the MBS;
    (c) identifies for the other sub-users a second maximum profit, wherein the second maximum profit is based on the data rate of the selected sub-user and the data rates of other sub-users;
    (d) allocates a best subcarrier to the selected sub-user;
    (e) determines whether the best subcarrier was allocated to one of the other sub-users prior to the best subcarrier being allocated to the selected sub-user;
    (f) determines whether another subcarrier was allocated to the selected sub-user prior to the best subcarrier being allocated to the selected sub-user; and
    (g) allocates the other subcarrier to the one of the other sub-users when: (1) it is determined that the best subcarrier was allocated to the one of the other sub-users prior to the best subcarrier being allocated to the selected sub-user; and (2) it is determined that the other subcarrier was allocated to the selected sub-user prior to the best subcarrier being allocated to the selected sub-user.

5. The system of claim 4, wherein the at least one hardware processor also repeats (b) through (g) for one of the other sub-users.

6. The system of claim 1, wherein the at least one hardware processor also performs an auction process to allocate subcarriers to the FU.

7. The system of claim 6, wherein, in performing the auction process, the at least one hardware processor also:
    (a) selects a sub-user of the FU as a selected sub-user;
    (b) identifies for the selected sub-user a first maximum profit, wherein the first maximum profit is based on a data rate of the selected sub-user and data rates of other sub-users of the FAP;
    (c) identifies for the other sub-users a second maximum profit, wherein the second maximum profit is based on the data rate of the selected sub-user and the data rates of other sub-users;
    (d) allocates a best subcarrier to the selected sub-user;
    (e) determines whether the best subcarrier was allocated to one of the other sub-users prior to the best subcarrier being allocated to the selected sub-user;
    (f) determines whether another subcarrier was allocated to the selected sub-user prior to the best subcarrier being allocated to the selected sub-user; and
    (g) allocates the other subcarrier to the one of the other sub-users when: (1) it is determined that the best subcarrier was allocated to the one of the other sub-users prior to the best subcarrier being allocated to the selected sub-user; and (2) it is determined that the other subcarrier was allocated to the selected sub-user prior to the best subcarrier being allocated to the selected sub-user.

8. The system of claim 7, wherein the at least one hardware processor also repeats (b) through (g) for one of the other sub-users.

9. A method for reducing femtocell interference, comprising:
    estimating, using at least one hardware processor, a total path loss between a macrocell user (MU) and a mobile base station (MBS);
    estimating, using the at least one hardware processor, a path loss from the MU user to a femtocell access point (FAP);
    determining, using the at least one hardware processor, whether the MU can meet a first target signal to interference plus noise ratio (SINR);
    determining, using the at least one hardware processor, whether a transmission from the MU will prevent a femtocell user (FU) of the FAP from achieving a second target SINR; and
    restricting, using the at least one hardware processor, the MU to using subcarriers not used by the FAP when it is determined that the MU cannot meet the first target SINR and/or it is determined the transmission from the MU will prevent the FU from achieving the second target SINR.

10. The method of claim 9, further comprising designating the MU as femto-interfering when it is determined that the MU cannot meet the first target SINR and/or it is determined the transmission from the MU will prevent the FU from achieving the second target SINR.

11. The method of claim 9, further comprising performing an auction process to allocate subcarriers to the MU.

12. The method of claim 11, wherein the auction process comprises:
    (a) selecting a sub-user of the MU as a selected sub-user;
    (b) identifying for the selected sub-user a first maximum profit, wherein the first maximum profit is based on a data rate of the selected sub-user and data rates of other sub-users of the MBS;
    (c) identifying for the other sub-users a second maximum profit, wherein the second maximum profit is based on the data rate of the selected sub-user and the data rates of other sub-users;
    (d) allocating a best subcarrier to the selected sub-user;
    (e) determining whether the best subcarrier was allocated to one of the other sub-users prior to the best subcarrier being allocated to the selected sub-user;
    (f) determining whether another subcarrier was allocated to the selected sub-user prior to the best subcarrier being allocated to the selected sub-user; and
    (g) allocating the other subcarrier to the one of the other sub-users when: (1) it is determined that the best subcarrier was allocated to the one of the other sub-users prior to the best subcarrier being allocated to the selected sub-user; and (2) it is determined that the other subcarrier was allocated to the selected sub-user prior to the best subcarrier being allocated to the selected sub-user.

13. The method of claim 12, further comprising repeating (b) through (g) for one of the other sub-users.

14. The method of claim 9, further comprising performing an auction process to allocate subcarriers to the FU.

15. The method of claim 14, wherein the auction process comprises:
    (a) selecting a sub-user of the FU as a selected sub-user;
    (b) identifying for the selected sub-user a first maximum profit, wherein the first maximum profit is based on a data rate of the selected sub-user and data rates of other sub-users of the FAP;
    (c) identifying for the other sub-users a second maximum profit, wherein the second maximum profit is based on the data rate of the selected sub-user and the data rates of other sub-users;
    (d) allocating a best subcarrier to the selected sub-user;
    (e) determining whether the best subcarrier was allocated to one of the other sub-users prior to the best subcarrier being allocated to the selected sub-user;
    (f) determining whether another subcarrier was allocated to the selected sub-user prior to the best subcarrier being allocated to the selected sub-user; and
    (g) allocating the other subcarrier to the one of the other sub-users when: (1) it is determined that the best subcarrier was allocated to the one of the other sub-users prior to the best subcarrier being allocated to the selected sub-user; and (2) it is determined that the other subcarrier was allocated to the selected sub-user prior to the best subcarrier being allocated to the selected sub-user.

16. The method of claim 15, further comprising repeating (b) through (g) for one of the other sub-users.

17. A non-transitory computer-readable medium containing computer-executable instructions that, when executed by a processor, cause the hardware processor to perform a method for reducing femtocell interference, the method comprising:
    estimating a total path loss between a macrocell user (MU) and a mobile base station (MBS);
    estimating a path loss from the MU user to a femtocell access point (FAP);
    determining whether the MU can meet a first target signal to interference plus noise ratio (SINR);
    determining whether a transmission from the MU will prevent a femtocell user (FU) of the FAP from achieving a second target SINR; and
    restricting the MU to using subcarriers not used by the FAP when it is determined that the MU cannot meet the first target SINR and/or it is determined the transmission from the MU will prevent the FU from achieving the second target SINR.

18. The non-transitory computer readable medium of claim 17, wherein the method further comprises designating the MU as femto-interfering when it is determined that the MU cannot meet the first target SINR and/or it is determined the transmission from the MU will prevent the FU from achieving the second target SINR.

19. The non-transitory computer readable medium of claim 17, wherein the method further comprises performing an auction process to allocate subcarriers to the MU.

20. The non-transitory computer readable medium of claim 19, wherein the auction process comprises:
    (a) selecting a sub-user of the MU as a selected sub-user;
    (b) identifying for the selected sub-user a first maximum profit, wherein the first maximum profit is based on a data rate of the selected sub-user and data rates of other sub-users of the MBS;
    (c) identifying for the other sub-users a second maximum profit, wherein the second maximum profit is based on the data rate of the selected sub-user and the data rates of other sub-users;

(d) allocating a best subcarrier to the selected sub-user;
(e) determining whether the best subcarrier was allocated to one of the other sub-users prior to the best subcarrier being allocated to the selected sub-user;
(f) determining whether another subcarrier was allocated to the selected sub-user prior to the best subcarrier being allocated to the selected sub-user; and
(g) allocating the other subcarrier to the one of the other sub-users when: (1) it is determined that the best subcarrier was allocated to the one of the other sub-users prior to the best subcarrier being allocated to the selected sub-user; and (2) it is determined that the other subcarrier was allocated to the selected sub-user prior to the best subcarrier being allocated to the selected sub-user.

21. The non-transitory computer readable medium of claim 20, wherein the method further comprises repeating (b) through (g) for one of the other sub-users.

22. The non-transitory computer readable medium of claim 17, wherein the method further comprises performing an auction process to allocate subcarriers to the FU.

23. The non-transitory computer readable medium of claim 22, wherein the auction process comprises:
(a) selecting a sub-user of the FU as a selected sub-user;
(b) identifying for the selected sub-user a first maximum profit, wherein the first maximum profit is based on a data rate of the selected sub-user and data rates of other sub-users of the FAP;
(c) identifying for the other sub-users a second maximum profit, wherein the second maximum profit is based on the data rate of the selected sub-user and the data rates of other sub-users;
(d) allocating a best subcarrier to the selected sub-user;
(e) determining whether the best subcarrier was allocated to one of the other sub-users prior to the best subcarrier being allocated to the selected sub-user;
(f) determining whether another subcarrier was allocated to the selected sub-user prior to the best subcarrier being allocated to the selected sub-user; and
(g) allocating the other subcarrier to the one of the other sub-users when: (1) it is determined that the best subcarrier was allocated to the one of the other sub-users prior to the best subcarrier being allocated to the selected sub-user; and (2) it is determined that the other subcarrier was allocated to the selected sub-user prior to the best subcarrier being allocated to the selected sub-user.

24. The non transitory computer readable medium of claim 23, wherein the method further comprises repeating (b) through (g) for one of the other sub-users.

* * * * *